July 4, 1933. A. F. BENNETT 1,916,914
CONTROL MECHANISM FOR MACHINE TOOLS
Filed July 29, 1931 2 Sheets-Sheet 1
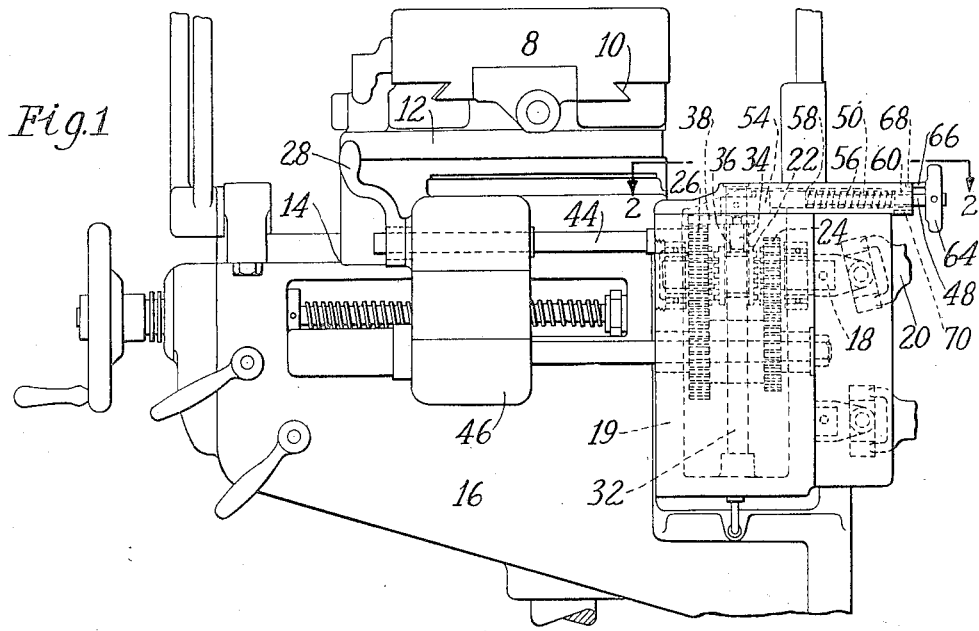
Fig.1
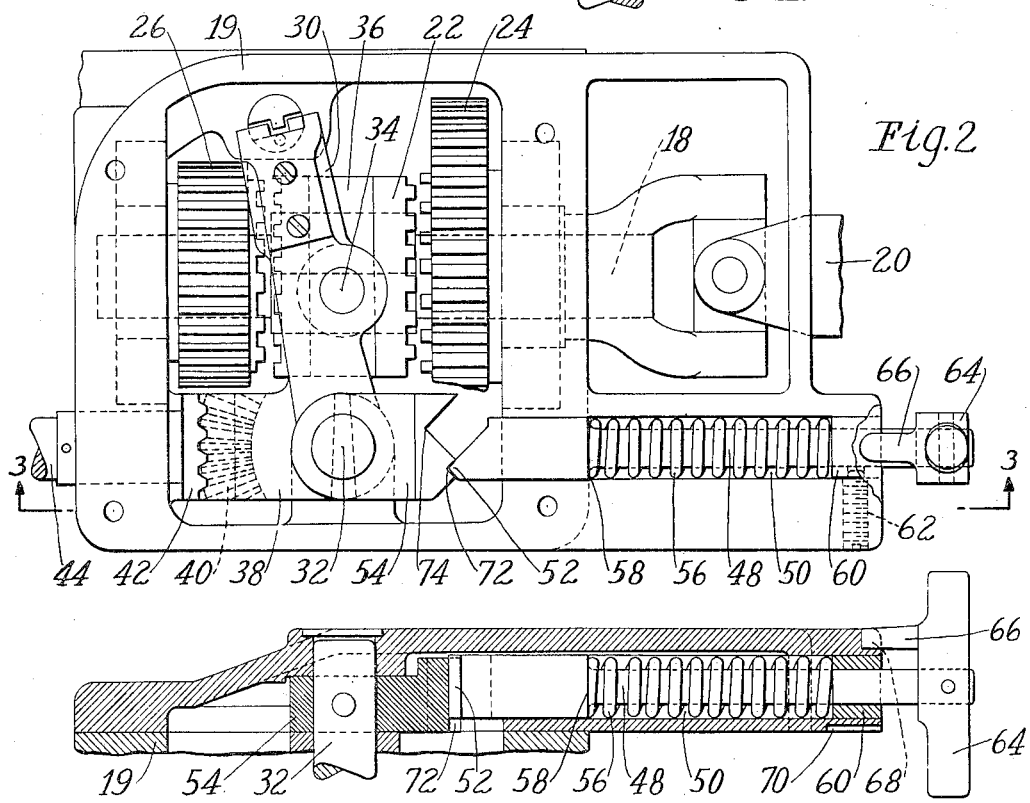
Fig.2
Fig.3
Witness
Chas. J. Olson
Inventor
Arthur F. Bennett
by his attorneys
Van Everen, Fish, Hildreth & Cary

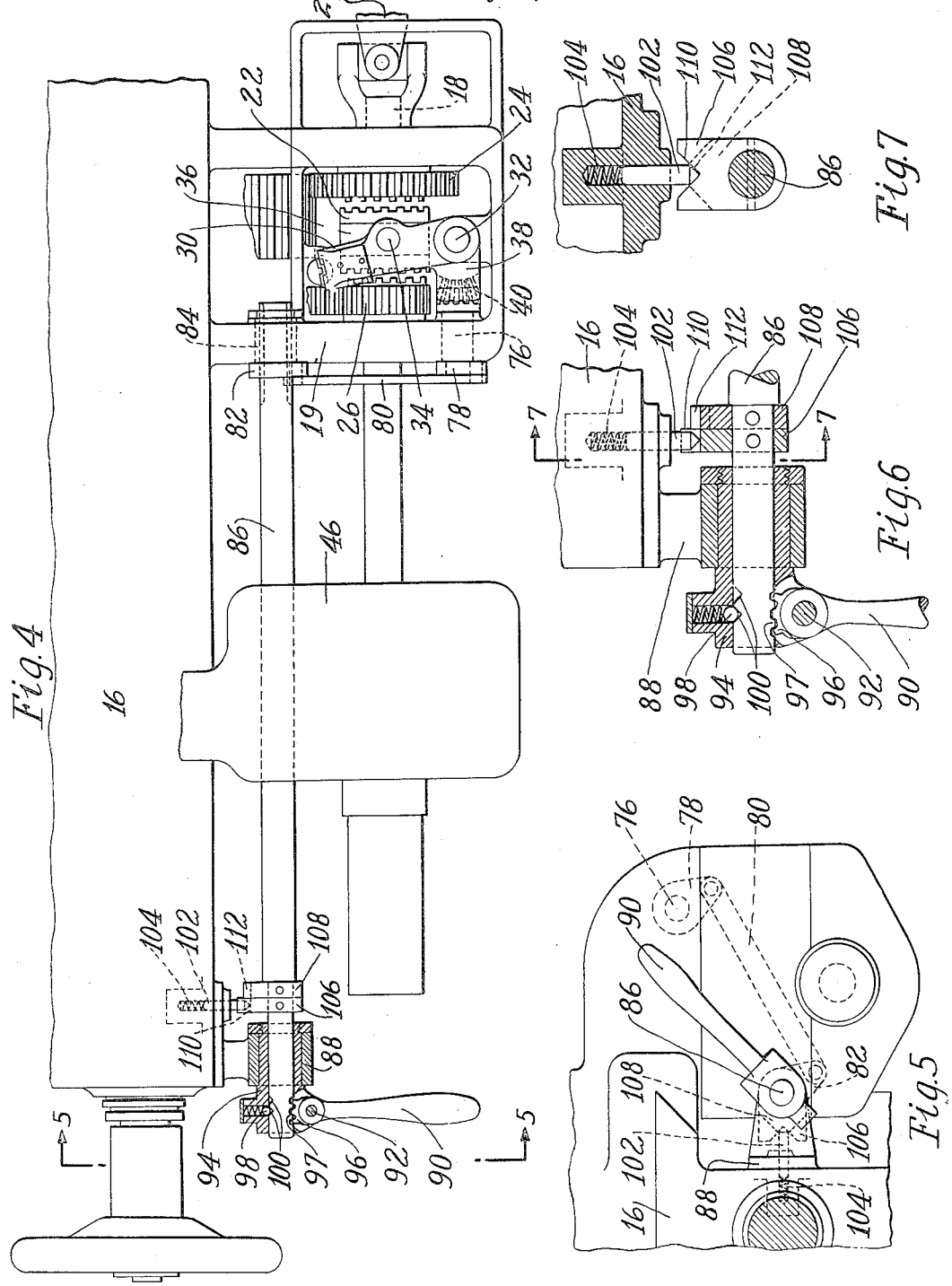

Patented July 4, 1933

1,916,914

UNITED STATES PATENT OFFICE

ARTHUR F. BENNETT, OF WEST BARRINGTON, RHODE ISLAND, ASSIGNOR TO BROWN AND SHARPE MANUFACTURING COMPANY, A CORPORATION OF RHODE ISLAND

CONTROL MECHANISM FOR MACHINE TOOLS

Application filed July 29, 1931. Serial No. 553,759.

The present invention relates to a manually operable control mechanism for a machine tool, and is herein described as embodied in a preferred form in mechanism for manually controlling the operation of the quick traverse drive for a milling machine.

The quick traverse driving mechanism for operating the table, saddle or knee in advance of the usual feeding rate, is intended primarily to enable the work supported on the table to be brought rapidly into position to be operated upon by the milling tools. Where one of said supports must be moved through a relatively long distance to bring the work into operative position, it is desirable that the operator be able to set the quick traverse mechanism to operate without further attention during a considerable period of time. However, as the work approaches the cutting tools, it becomes necessary for the operator to have a more complete control of the rapid traverse mechanism so that the quick traverse clutch may be thrown out instantaneously to prevent the work while moving at the quick traverse rate into engaging contact with the cutting tools, which would result in overloading and breaking the cutter.

It is a principal object of the present invention to provide a novel and improved manually operable control mechanism for a machine clutch, which will be particularly adapted to enable the operator readily and certainly to control the operation of the quick traverse drive for a milling machine.

More specifically, an object of the invention is to provide novel and improved operating connections for actuating a power clutch from a manually operable control lever which may be adjusted alternatively to automatically release the clutch when the lever is released by the operator, or to latch the clutch in operative position.

With these and other objects in view, as may hereinafter appear, the several features of the invention consist in the devices, combinations and arrangements of parts hereinafter described and claimed which will be readily understood by one skilled in the art from the following description when taken in connection with the accompanying drawings.

In the drawings, Fig. 1 is a view in side elevation of a work table and the supporting saddle and knee of a milling machine embodying the several features of the present invention; Fig. 2 is a detail sectional plan view taken on the line 2—2 of Fig. 1, showing a quick traverse clutch for driving the work table at each of two quick traverse rates, and portions of the control mechanism for the clutch; Fig. 3 is a sectional view taken on the line 3—3 of Fig. 2; Fig. 4 is a plan view with parts broken away illustrating a modified form of the manual control mechanism for the quick traverse clutch; Fig. 5 is a front elevation taken on the line 5—5 of Fig. 4; Fig. 6 is a detail sectional view on a large scale of a portion of the mechanism shown in Fig. 4; and Fig. 7 is a sectional view taken on the line 7—7 of Fig. 6.

The invention is hereinafter disclosed as embodied in a milling machine having the same general construction and arrangement of parts as shown in the application of Benjamin P. Graves and Arthur F. Bennett, Serial No. 181,050, filed April 5, 1927, only so much of the machine being herein disclosed as is necessary to show the connection of the present invention therewith. This machine is provided with a milling cutter spindle supported on the machine column, and a work supporting table arranged for longitudinal movements relatively thereto on a transversely movable saddle which is in turn supported on a vertically movable knee to enable the work to be moved readily in any direction with relation to the milling cutter. As shown in Fig. 1 of the drawings, the work table is indicated at 8 sliding in ways 10 on a saddle 12 which is mounted for transverse movements on ways 14 on the vertically movable knee 16. The connections for the hand and power drives for the table, saddle and knee are fully illustrated and described in the copending application above referred to, and are not herein disclosed, inasmuch as these mechanisms are not directly concerned with the present invention.

The table may be driven through the power driving connections at either of two rapid traverse rates, and the saddle and knee may be driven at one quick traverse rate through a quick traverse mechanism comprising a driving shaft 18 which is housed in a casing 19 on the knee support 16, and is constantly driven through a universal connection 20 from driving connections located in the main column of the machine. The drive is taken from the quick traverse shaft 18 through a clutch member 22 which is keyed to turn with the shaft 18 and is arranged for endwise movement in either direction to engage with corresponding clutch surfaces formed on the adjacent faces of the gears 24 and 26 loosely sleeved to turn on the quick traverse shaft 18 and connected through gearing not herein shown, to the power driving connections for the table, saddle and knee.

As shown in Figs. 1 to 3 of the drawings illustrating one embodiment of the present invention, the quick traverse clutch 22 is operated from a manual control lever 28 through connections comprising a lever arm 30 secured to a vertical rock shaft 32 and connected by a pin 34 with a yoke 36 on the clutch member 22. A short lever arm 38 is secured to the rock shaft 32, and is provided with a bevel gear segment 40 meshing with a corresponding bevel gear 42 formed on the end of a rock shaft 44 which extends forwardly through a casing 46 housing the gear connections for the table drive, and at its forward end is journalled through the hub of the manual control lever 28 which is mounted to turn in a bearing in the casing 46, and is keyed to rotate the shaft 44. These connections as thus far described are similar in every respect to those disclosed in the above mentioned application, to which reference may be had for a more complete disclosure and description of this mechanism.

In order to provide a more efficient and versatile control mechanism for the rapid traverse clutch, and enable the operator to latch the clutch in either of its operating or neutral positions when the rapid traverse drive is to be kept in operation for an appreciable period of time, or alternatively to engage the rapid traverse clutch momentarily, so that it automatically moves back into neutral position when released by the hand of the operator, mechanism is provided which may be adjusted alternatively to bring the clutch back to neutral position at all times when the control lever 28 is released by the hand of the operator, or to latch the clutch in the position to which it is moved by the operator. This mechanism comprises a plunger 48 which is mounted to slide in a recess 50 formed in the rear side of the casing 19 on the knee support 16, and is provided at its forward end with a V-shaped tip 52 offset from the axis of the plunger and arranged to engage with corresponding cam surfaces formed on an arm 54 secured to the rock shaft 32. The plunger is held yieldingly in contact with the cams by means of a compression spring 56 coiled about the stem of the plunger between a shoulder 58 formed by the enlarged head or tip of the plunger and a collar 60 which is rigidly secured by a screw 62 within the rear end of the recess 50 to form a bearing for the plunger stem. A handle in the form of a short cross bar 64 is secured to the rear end of the plunger and is provided with a tongue or key 66 which is arranged to engage in either of two corresponding slots 68 or 70 formed in the casing to hold the plunger against rotary movement, and to provide means for enabling the operator accurately to adjust the rotary position of the plunger to engage the tip 52 accurately with the corresponding cam surfaces on the arm 54. With the parts in the positions shown in Fig. 2 of the drawings, the tip 52 of the plunger engages with a small V-shaped cam surface 72 which is provided on each side with receding surfaces, so that when the shaft 32 is rocked to move the clutch member in either direction into operative engagement with the gears 24 or 26, the plunger 52 will ride out of the notch 72 onto one of the adjacent surfaces to latch the clutch yieldingly in position. With this position of the plunger, it will be seen that the clutch it latched in either of the operating positions to which it is moved by the operator, and is also centered accurately in neutral position when disengaged by the operator. When it is desired to adjust the manually operable control mechanism for the clutch to cause the clutch member 22 to be brought back automatically to rest position as the hand lever 28 is released by the operator, the plunger 48 is retracted against the pressure of the spring 56 to disengage the key 66 from its slot 68, and is then rotated through 180° and released to bring the key into engagement with the slot 70. This rotary movement of the plunger brings the offset tip 52 of the plunger into operative engagement with a large V-shaped cam surface 74 arranged so that a movement of the rock shaft 32 and the clutch member 22 in either direction will cause the tip 52 of the plunger to ride up on the side portions of the notch 74 against the pressure of the spring 56 which will tend at all times to return the rock shaft 32 and clutch 22 to their neutral positions with the tip 52 in engagement with the apex or bottom of the notch 74.

Figs. 4 to 7 inclusive of the drawings illustrate a modified form of the mechanism for alternatively latching the clutch in operative position, and for returning it to neutral position when the manually operable control lever 28 is released by the operator. In this form of the device, a stub shaft 76 is journaled in the casing 19 within which the quick traverse clutch mechanism is housed, and is provided at one end with a bevel gear arranged to engage with the bevel gear segment 40 on the arm 38 secured to the rock shaft 32. The stub shaft 76 is also provided with an arm 78 which is connected by a link 80 with an arm 82 formed on a sleeve 84 which is keyed to turn with a control bar 86 and is journalled against endwise movement in bearings formed in the casing 19. The control bar 86 is journalled through the casing 46 and at its forward end is mounted for endwise and rotational movements in a bracket 88 on the knee. Rotational movements are imparted to the control bar 86 to control the position of the clutch member 22 by means of a manually operable control lever 90 which is arranged to rotate with the control bar 86, and also has a pivotal movement longitudinally of the bar to impart lengthwise movements thereto. For this purpose the lever 90 is mounted on a transverse pivot 92 on a sleeve 94 which is keyed to turn with the bar 86, and is journalled in the bracket 88. A shoulder is formed at each end of the sleeve to prevent endwise movement of the sleeve while permitting it to be turned freely with the bar 86. In order to impart lengthwise movement to the control bar 86, the hand lever 90 is provided with a gear segment 96 which engages with a corresponding rack 97 formed in the bar 86. A spring-pressed detent 98 mounted in the sleeve 94 is arranged to engage alternatively with two notches 100 in the control bar 86 to latch it in either of two alternative positions to which it is moved by the movement of the hand lever 90 about the pivot 92.

In this modified form of the device, a spring-pressed plunger 102 is mounted in a recess 104 in the knee support 16, and is arranged with a V-shaped tip to engage alternatively with the cams 106 and 108 secured to the control bar 86 depending upon the lengthwise position of the shaft 86. During normal operation with the hand lever 90 set at right angles to the control bar 86 as shown in Fig. 4, the spring-pressed plunger is arranged to engage with the deep faced notch 110 of the cam 106, so that the spring plunger riding on the sides of the notch will at all times tend to disengage and return the clutch to its neutral position. The cam 108 secured to the control bar 86 adjacent to the cam 106 is provided with a relatively shallow notch 112 with adjacent receding surfaces, so that the spring plunger cooperating with this cam will act to hold the control bar 86 in the angular position to which it is moved by the operator, and latch the clutch member 22 in each of its operating and rest positions. The notches 110 and 112 of the two cams are positioned so that their apexes form a continuous line to facilitate the movement of the plunger from one cam to the other as the control bar 86 is moved lengthwise by the movement of the hand lever 90 about its pivot 92 lengthwise of the control bar.

The invention having been described, what is claimed is:

1. A manually operable control mechanism for a machine tool comprising a clutch member arranged to be moved alternatively into an operative and a rest position, a member connected for rotary movement to actuate the clutch, a spring plunger, a cam on said member engaged by the plunger tending yieldingly to turn said rotatable member to disengage and maintain the clutch connected thereto in rest position, and a cam on said member alternatively engaged by the plunger to hold the rotatable member and clutch yieldingly in each of said operating and rest positions.

2. A manually operable control mechanism for a machine tool comprising a clutch member arranged to be moved alternatively into two operative positions and having an intermediate rest position, a member connected for rotary movement to actuate the clutch, a spring plunger, a cam on said member engaged by the plunger tending yieldingly to turn said rotatable member to disengage and maintain the clutch connected thereto in the intermediate rest position, a cam on said member alternatively engaged by the plunger to hold the rotatable member and clutch yieldingly in each of their operating and rest positions, and means for relatively positioning the plunger and cams to cause the plunger alternatively to engage with one or the other of said cams.

3. A manually operable control mechanism for a machine tool comprising a clutch member arranged to be moved alternatively into a plurality of operative positions and having an intermediate rest position, a manually operable control member movable to actuate said clutch, a spring-pressed plunger, a cam on said control member arranged for engagement with the plunger to disengage and maintain the clutch yieldingly in the intermediate rest position, a second cam on said member arranged for engagement with the plunger to maintain the clutch yieldingly in each of said operating and rest positions, and means for relatively positioning the plunger and said cams to cause the plunger alternatively to engage with one or the other of said cams.

4. A manually operable control mechanism for a machine tool comprising a clutch member arranged to be moved alternatively into a plurality of operative positions and having an intermediate rest position, a member movable to actuate said clutch, means under control of the operator for actuating said control member to operate the clutch, a spring-pressed plunger, a cam on said member arranged for engagement with the plunger to return and maintain the clutch yieldingly in the intermediate rest position, a second cam on said member arranged for engagement with the plunger to maintain the clutch yieldingly in each of said operating and rest positions, and means under the control of the operator for relatively positioning the plunger and said cams to cause the plunger alternatively to engage with one or the other of said cams.

5. A manually operable control mechanism for a machine tool comprising a drive shaft, two driven members loosely sleeved to the drive shaft, a clutch member keyed to turn with the drive shaft and interposed between said driven members, a control member movable to move the clutch member lengthwise of the drive shaft into intermediate rest position alternatively into engagement with one of said driven members, a spring-pressed plunger, a cam on said control member arranged for engagement with the plunger to return and maintain the clutch yieldingly in intermediate rest position, a second cam on said control member arranged for engagement with the plunger to maintain the clutch yieldingly in each of said operating and rest positions, means under control of the operator for actuating said control members to operate the clutch, and means under the control of the operator for relatively positioning the plunger and said cams to cause the plunger alternatively to engage with one or the other of said cams.

6. A manually operable control mechanism for a machine tool comprising a clutch member arranged to be moved alternatively into a plurality of operative positions and having an intermediate rest position, a manually operated control member movable to actuate said clutch member, a spring-pressed plunger provided with a V-shaped tip, a cam on said control member having a V-shaped notch arranged for engagement with the tip of the plunger to disengage and hold the clutch yieldingly in rest position, a second cam on said control member having a V-shaped notch with relatively short sides and adjacent receding surfaces arranged for engagement with the tip of the plunger to maintain the clutch yieldingly in either of said operating and rest positions, and means for relatively positioning the plunger and said cams to cause the plunger alternatively to engage with one or the other of said cams.

7. A manually operable control mechanism for a machine tool comprising a clutch member arranged to be moved alternatively into two operative positions and having an intermediate rest position, a manually operable control member movable to actuate the clutch, and means arranged alternatively to disengage and hold the clutch yieldingly in rest position and to latch the clutch yieldingly in each of said operative and rest positions.

8. A manually operable control mechanism for a milling machine provided with a movable support and means for actuating said support including a rapid traverse drive shaft, comprising a clutch member arranged to connect said drive shaft to drive said support at one of two rapid traverse rates, a manual control member movable to actuate said clutch, and means arranged alternatively to disengage and hold the clutch yieldingly in rest position and to latch the clutch yieldingly in each of its operative and rest positions.

9. A manually operable control mechanism for a milling machine provided with a movable support and means for actuating said support including a rapid traverse drive shaft, comprising a clutch member arranged to be moved alternatively into two operative positions to drive the movable support at two different rapid traverse rates and having an intermediate rest position, a manual control member movable to actuate said clutch, and means arranged alternatively to disengage and hold the clutch yieldingly in rest position and to latch the clutch yieldingly in each of its operative and rest positions.

10. A manually operable control mechanism for a machine tool comprising a clutch member arranged to be moved alternatively to an operative and rest position, a manually operable control member connected for rotary movement to actuate said clutch, a spring-pressed plunger, a cam on said control member having a surface arranged for engagement with the plunger shaped to disengage and maintain the clutch yieldingly in rest position, a second cam having a surface arranged for engagement with the plunger shaped to maintain the clutch yieldingly in each of said operating and rest positions, and a manual control lever movable in one direction to rotate said control member, and movable in another direction to impart lengthwise movements to said member for causing the plunger alternatively to engage with one or the other of said cams.

11. A manually operable control mechanism for a machine tool comprising a clutch member arranged to be moved alternatively into a plurality of operative positions and having an intermediate rest position, a manually operable control member movable to actuate said clutch, a spring-pressed plunger provided with a V-shaped tip offset from the axis of the plunger, a cam on said control member arranged for engagement with the tip of the plunger to maintain the clutch yieldingly in each of said operating and rest positions, a second cam on said control member arranged for engagement with the tip of the plunger to disengage and maintain the clutch yieldingly in rest position, and means for securing the plunger against rotation alternatively in one of two predetermined positions to engage the tip of the plunger with one or the other of said cams.

12. A manually operable control mechanism for a machine tool comprising a clutch member arranged to be moved alternatively into a plurality of operative positions and having an intermediate rest position, a manually operable control member movable to actuate said clutch, a spring-pressed plunger provided with a V-shaped tip offset from the axis of the plunger, a cam on said control member arranged for engagement with the tip of the plunger to disengage and hold the clutch yieldingly in the intermediate rest position, a second cam on said control member arranged for engagement with the tip of the plunger to maintain the clutch yieldingly in each of said operating and rest positions, a casing in which the plunger is mounted, a key formed on the plunger arranged to engage alternatively in one of two slots formed in the casing to position the plunger against rotation alternatively in one of two positions to cause the tip of the plunger to engage with one or the other of said cams.

13. A manually operable control mechanism for a machine tool comprising a clutch member arranged to be moved alternatively into two operative positions and having an intermediate rest position, a manually operable control member connected for rotary movement to actuate said clutch, a spring-pressed plunger having a V-shaped tip, a cam on said control member having a V-shaped surface arranged for engagement with the plunger to disengage and maintain the clutch yieldingly in the intermediate rest position, a second cam on said member having a V-shaped surface and receding surfaces adjacent thereto, the apexes of said V-shaped surfaces being arranged in alinement with each other, and means for imparting an endwise movement to said control member to cause the plunger alternatively to engage with one or the other of said cams.

14. A manually operable control mechanism for a machine tool comprising a clutch member arranged to be moved alternatively into two operative positions and having an intermediate rest position, a manually operable control member connected for rotary movement to actuate said clutch, a spring-pressed plunger having a V-shaped tip, a cam on said control member having a V-shaped surface arranged for engagement with the plunger to disengage and maintain the clutch yieldingly in the intermediate rest position, a second cam on said member having a V-shaped surface and receding surfaces adjacent thereto, the apexes of said V-shaped surfaces being arranged in alinement with each other, means for imparting an endwise movement to said control member to cause the plunger alternatively to engage with one or the other of said cams, and a spring detent arranged to hold the control member in position axially in each of said positions.

15. A manually operable control mechanism for a machine tool comprising a clutch member arranged to be moved alternatively into two operative positions and having an intermediate rest position, a manually operable control member connected for rotary movement to actuate said clutch, a spring-pressed plunger having a V-shaped tip, a cam on said control member having a V-shaped surface arranged for engagement with the plunger to disengage and maintain the clutch yieldingly in the intermediate rest position, a second cam on said member having a V-shaped surface and receding surfaces adjacent thereto, the apexes of said V-shaped surfaces being arranged in alinement with each other, means for imparting an endwise movement to said control member to cause the plunger alternatively to engage with one or the other of said cams, and a manual control lever connected to rotated with the control member and movable about a pivot axially thereof to impart lengthwise movements to said member.

In testimony whereof I have signed my name to this specification.

ARTHUR F. BENNETT.